O. C. KAVLE.
GEAR TESTING MECHANISM.
APPLICATION FILED AUG. 2, 1919.
1,395,582.
Patented Nov. 1, 1921.
2 SHEETS—SHEET 1.
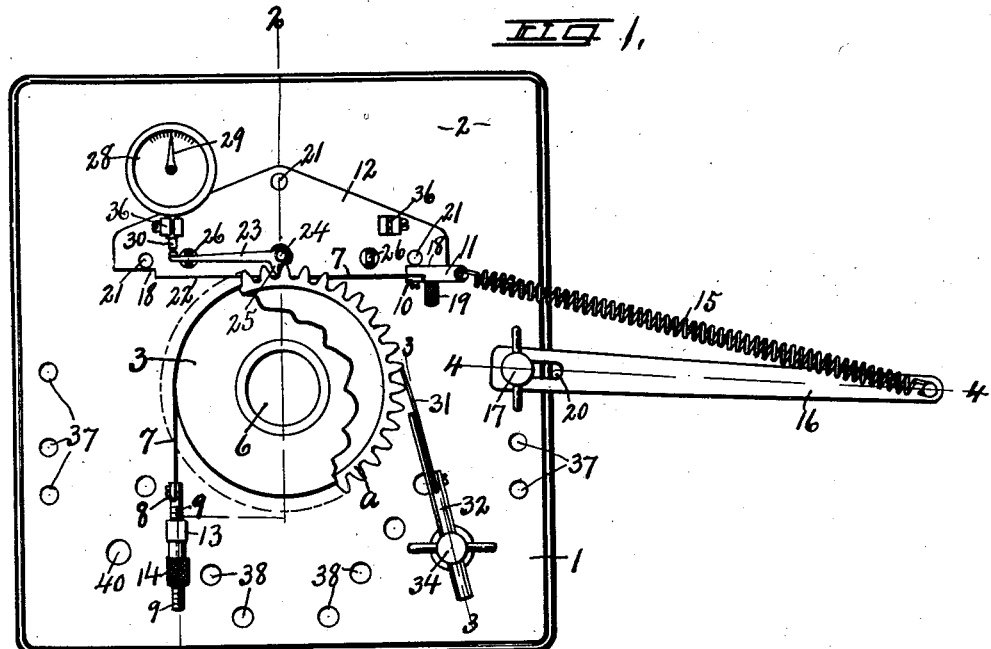
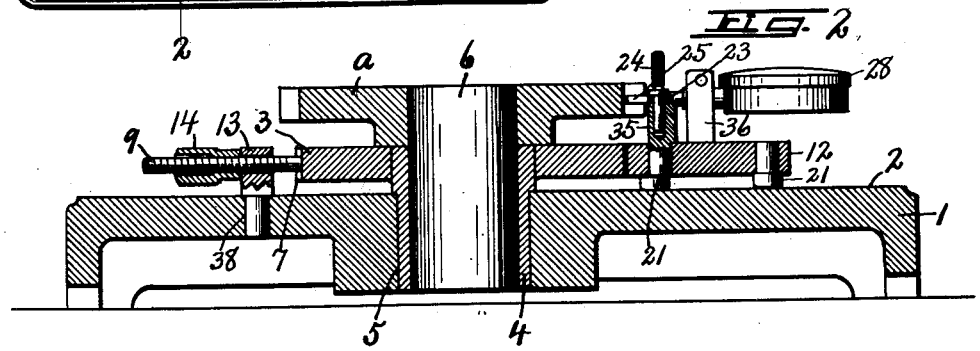
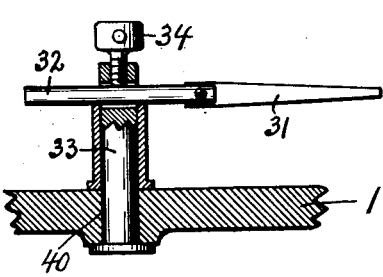
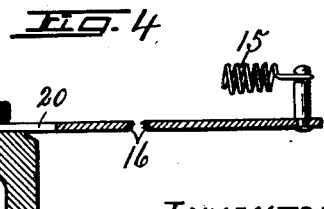
INVENTOR
Oscar C. Kavle
BY Howard T. Denison
ATTORNEY

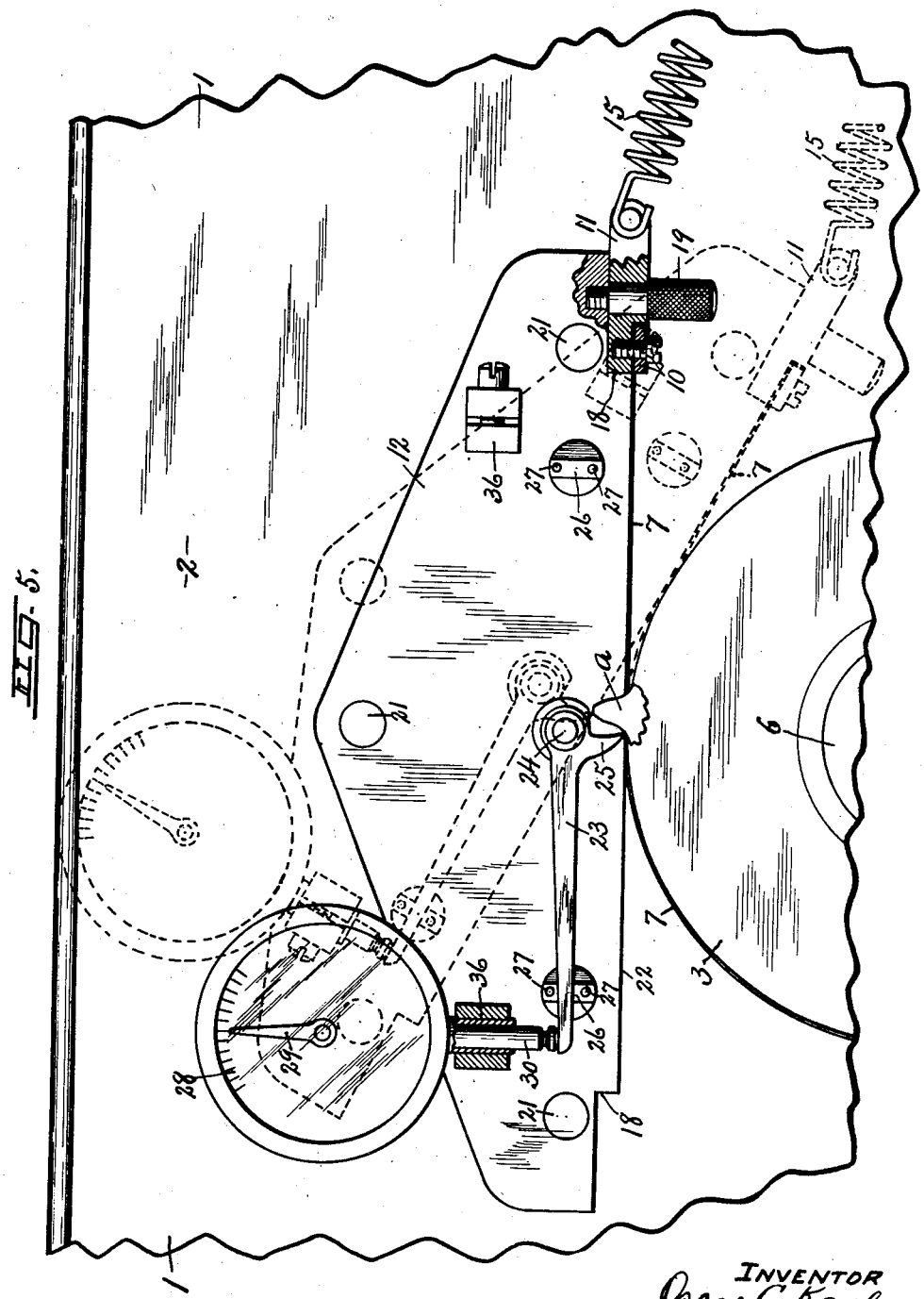

UNITED STATES PATENT OFFICE.

OSCAR C. KAVLE, OF SYRACUSE, NEW YORK.

GEAR-TESTING MECHANISM.

1,395,582.   Specification of Letters Patent.   Patented Nov. 1, 1921.

Application filed August 2, 1919. Serial No. 315,020.

*To all whom it may concern:*

Be it known that I, OSCAR C. KAVLE, of Syracuse, in the county of Onondaga, in the State of New York, have invented new and useful Improvements in Gear-Testing Mechanism, of which the following, taken in connection with the accompanying drawings, is a full, clear, and exact description.

This invention relates to certain improvements in gear testing machines for determining the accuracy of involute forms of gear teeth or more specifically the actual run out or form of the bearing faces of the teeth necessary to constitute a perfectly smooth and noiseless mesh for gears of any prescribed pitch.

The main object is to provide simple and efficient means under the control of the operator for making the desired test and indicating the degree and location of any inaccuracy which may exist in the form of each tooth.

Another object is to determine the degree of accuracy of the spacing of the teeth relatively to each other.

A further object is to provide for the reversal of the rocking tangent member for testing opposite faces of the teeth.

Other objects and uses relating to specific parts of the testing instrument as a whole will be brought out in the following description.

In the drawings:

Figure 1 is a top plan of a gear testing instrument embodying the various features of my invention and a portion of a gear to be tested being also shown.

Fig. 2 is an enlarged transverse vertical sectional view taken on line 2—2, Fig. 1.

Fig. 3 is an enlarged detailed sectional view taken on line 3—3, Fig. 1.

Fig. 4 is a sectional view taken on line 4—4, Fig. 1.

Fig. 5 is an enlarged top plan partly in section of the major portion of the testing mechanism including the rocking tangent member which is shown by full lines and by dotted lines in its extreme position for testing the form of the tooth from the base to the point, one of the teeth being indicated in full lines.

As illustrated this instrument comprises a substantially rectangular base plate —1— adapted to rest upon a bench or other suitable support and is provided with a flat substantially horizontal surface —2— upon which the rocking tangent member, presently described, is adapted to rest during its rocking movement. A circular disk —3— is centrally supported upon the base plate —1— with its axis at right angles to the surface —2— and for this purpose is provided with a hub —4— adapted to fit snugly in a central bore —5— in said base plate so that the disk may be removed and replaced by others of different diameter when testing gears of different pitch, or may be adjusted rotarily, if desired, the diameter of the disk corresponding approximately to that of the gear to be tested at the base circle of the teeth minus the thickness of the tape which actually forms the bearing for the rocking tangential member.

A gear supporting stud —6— is mounted coaxially with and preferably upon the disk —3— and projects above the surface thereof to receive and support a gear as —*a*— the teeth of which are to be tested, said gear being rotatable upon or with its supporting stud —6— and is readily accessible to the operator for turning step by step in the operation of testing each tooth. A comparatively thin steel tape —7— is passed around and against the periphery of substantially one-quarter of the disk —3— and has one end secured by a clamp —8— to an adjustable anchorage —9— and its other end is secured by a similar clamp —10— to an arm —11— on one end of a rocking tangent member —12— so that the ends of the tape extend tangentially from the periphery of the disk —3—. The anchorage —9— preferably consists of a screw which is supported in an apertured post —13— on the base plate —1— so as to extend tangentially to the periphery of the disk —3— or in line with the adjacent end of the tape —7— and is provided with an adjusting nut —14— bearing against the outer face of the post —13— for adjusting the tape and assisting and holding it tightly against the periphery of the disk.

The arm —11— to which the other end of the tape is attached is connected by a coil spring —15— to one end of a supporting arm —16— having its opposite end adjustably secured by a screw —17— to the base plate —1— as shown clearly in Fig. 4. It will now appear that this tape is rigidly held by the anchorage —9— at one side of the disk —3— while the opposite end is yieldingly held under the tension of the spring —15— at the opposite side of the disk tending to keep the tape —7— tightly against the periphery of the disk and at the same time permitting the lap of the tape upon the periphery of the disk to be increased or diminished as the member —12— is rocked in reverse directions.

The arm —11— is preferably supported in a recess —18— in the adjacent end of the rocking member —12— and is held in operative position by a clamping screw —19—, the opposite end of said rocking member being provided with a similar recess —18— to permit the tensioning device to be reversed end for end on the rocking member as will be hereinafter more fully explained. The clamping screw —17— constitutes a pivot which when loosened permits the arm —16— to be adjusted about its axis for varying the position of its point of connection with the spring —15— as may be necessary for gears of different diameters, said arm being also slotted longitudinally at —20— to allow it to be adjusted longitudinally when necessary for varying the tension of the spring.

The rocking member —12— preferably consists of a substantially flat plate having a series of, in this instance 3, bearing points or pins —21— resting upon the surface —2— of the base plate —1— to permit it to be easily moved across the surface of said plate in parallelism therewith, said rocking member being also provided with a straight edge —22— resting upon or against the outer surface of the tape —7— and, therefore, tangential to the periphery of the disk —3—.

This tangential relation of the rocking member —12— is maintained by the tension of the spring —15— in all positions of adjustment of said rocking member.

By connecting the tape and attaching the spring —15— in the manner shown and described, it is evident that the straight edge of the rocking member —12— will be drawn against the tape and the tape, in turn, drawn against the periphery of the disk —3— as the member —12— is rocked, thereby causing the member —12— to move around the periphery of the disk with a rolling motion similar to that of a companion gear. It is also evident that during this rocking movement a tangent point in the straight edge —22— will describe a substantially involute form of tooth from the base circle to the point thereof and it is upon this theory that the test of the form of the tooth is made.

To this end a bell crank lever —23— is pivoted at —24— to the member —12— substantially midway between the ends of the straight edge —22— and in relatively close proximity thereto, said lever being provided with a comparatively short arm —25— which constitutes a contact finger the point of which is somewhat hook shaped for engagement with the surface of the tooth to be tested, the contact point being substantially coincident with the straight edge —22— so as to travel across the face of the gear from the base to the point thereof as the member —12— is rocked in reverse directions during the testing operation.

The longer arm of the lever —23— preferably rides upon a bearing surface —26— between two stop pins —27— thereon, said stop pins being spaced apart at opposite sides of the interposed portion of the lever —23— with sufficient clearance to allow the lever to oscillate in testing the most inaccurate form of tooth and at the same time serve to keep the lever within working limits for testing successive teeth of the gear, it being understood that the contact finger —25— is considerably less than the space between adjacent teeth of the gear to allow it to readily enter those spaces without contact with the tooth adjacent the one being tested.

Now, assuming that it is desired to test the accuracy of the form of a gear tooth and that the rocking member —12— is adjusted to the position shown by full lines in Figs. 1 and 5 so as to bring the point of the contact member —25— at the point of intersection of the tooth surface with the base circle, then by adjusting the rocking member —12— by hand from its starting position to the right will cause the point of the contact member to travel across the surface of the tooth being tested toward the point thereof and if the form of said surface is correct the lever —23— will maintain the same relation to the member —12— in all positions of adjustment of said member but, if the form of the tooth is inaccurate, the lever —23— will be rocked more or less from its starting position which will indicate the inaccuracy and the location thereof.

Suitable means is provided for determining the degree of movement of the lever —23— from its normal position consisting in this instance of a dial —28— and a pointer —29— movable around the dial and actuated by a plunger —30— which is held in contact with the free end of the long arm of the lever by any suitable mechanisms not necessary to herein illustrate or describe, it being also understood that motion may be transmitted from the plunger —30— to the index finger —29— by any well known works common in dial indicators of this character. The pointer —29— is normally registered with a zero graduation on the dial —28— which is also graduated in opposite directions from zero.

When the parts of the device are properly assembled, the pointer —29— will be at its zero position when the contact finger —25— is registered with the base circle of the gear or with the tangent point of the tape relative to the periphery of the disk —3— and will remain in that position as the member —12— is rocked or rolled about the periphery of the disk, but if there is the slightest inaccuracy in the form of the tooth surface being tested during said rocking movement of the member —12—, it will be indicated by the shifting position of the pointer —29— relative to the graduations on the dial and will indicate the degree and location of the imperfection.

This instrument is also adapted for testing the accuracy of spacing of the gear teeth and for this purpose is provided a detent or stop finger —31— preferably of hardened steel secured to a supporting member —32— which in turn is clamped to a post —33— on the bed plate —1— by means of a screw —34— and may be adjusted for gears of different pitch by simply loosening the screw —34—. This stop finger —31— is arranged tangentially to the periphery of the gear to engage one of the teeth and hold the gear against movement in one direction while permitting its movement in the reverse direction, the distance between the point of the detent —31— and contact point —25— around the circumference of the gear being arranged to correspond to a predetermined number of teeth for a gear of given pitch so that when the points of the contact members —25— and —31— are once set for a gear of certain pitch according to a master pattern the gears to be tested must have the same number of teeth between those points to be accurate and, if not, the inaccuracy is immediately apparent.

The pivotal pin —24— for the lever —23— is removably inserted in a socketed post —35— on the rocking member —12— while the dial indicator —28— is removably supported in a post —36— on the same member which is provided with duplicate posts —35— and —36— to permit the lever and dial indicator to be reversed on the plate —12— when testing the opposite faces of the gear teeth. The screw clamp —17— may be secured in any one of a set of apertures —37— in the base plate —1— in testing gears of different sizes and for a similar reason the post —13— for the clamping screw —9— may be secured in any one of a set of sockets —38— in the same plate.

In reversing the lever —23— and its indicator —28— for testing the opposite faces of the teeth, the steel band or ribbon —7— and parts to which it is attached will also be reversed by securing the arm —11— to the opposite end of the member —12— and by placing the post —13— in one or the other of a duplicate set of apertures —38— and similarly reversing the position of the arm —16— and spring —15— by securing the post —17— in one or the other of an opposite set of apertures —37— while the supporting post —33—, which is secured in an aperture —40—, may be secured in a similar aperture at the opposite side of the disk.

What I claim is:—

1. A gear testing mechanism comprising a circular bearing, a member in rolling contact with said bearing, means for maintaining said contact, means for supporting a gear to be tested coaxially with the circular bearing, a contact device mounted upon and movable with said member in contact with a tooth of the gear and having an independent movement caused by imperfections in said tooth, and means for indicating the amount of movement of said device from a normal position.

2. A gear testing mechanism comprising means for supporting a gear, a curved bearing of substantially the same radius as that of the base circle of the gear and coaxial therewith, a contact member for engaging the face of a gear tooth, a support for said contact member movable with a rolling motion along and upon said bearing, whereby the contact member is caused to move in contact with the face of the gear tooth, and an indicator operated by said contact member.

3. A gear testing mechanism comprising means for supporting a gear, a curved bearing of substantially the same radius as that of the base circle of the gear and coaxial therewith, a contact member for engaging the face of a gear tooth, a support for said contact member movable with a rolling motion along and upon said bearing, whereby the contact member is caused to move in contact with the face of the gear tooth, said contact member having an independent rocking movement on the support caused by imperfections in the tooth surface across which it is moved, and an indicator operated by said contact member.

4. In a gear testing mechanism the combination of a gear support, a curved bearing of substantially the same radius as that of the gear to be tested, and coaxial with the axis of said gear when the latter is mounted upon its support, a contact member for engaging the face of a gear tooth, a support for the contact member having a rolling motion along and upon said bearing, a detent for engaging one of the gear teeth to prevent rotation of the gear in one direction and to determine the accuracy of the spacing of the teeth of said gear, and an indicator operated by said contact member.

5. In a gear testing mechanism the combination of a gear support, a circular disk coaxial therewith, a flexible tape tensioned around and against the periphery of said disk, a rocking member in rolling contact with the tape, a contact member pivotally mounted upon the rocking member for engagement with the surface of one of the gear teeth whereby the rolling movement of the rocking member will cause the contact member to move in contact with the face of said tooth, and an indicator operated by said contact member.

6. In a gear testing mechanism the combination of a gear support, a circular disk coaxial therewith, a flexible tape tensioned around and against the periphery of said disk, a rocking member in rolling contact with the tape, a contact member pivotally mounted upon the rocking member for engagement with the surface of one of the gear teeth whereby the rolling movement of the rocking member will cause the contact member to move in contact with the face of said tooth, and means for indicating the amount of movement of said contact member about the axis of its pivot caused by imperfections in the tooth surface.

7. In a gear testing mechanism the combination of a gear support, a circular disk of a diameter substantially equal to that of a base circle of the gear teeth, a flexible tape anchored at one end and passed around and against a portion of the periphery of the disk, a rocking member attached to the other end of the tape and resting thereon and movable with a rolling motion along the periphery of the disk, means for tensioning the tape along the periphery of the disk, and a contact member mounted on the rocking member for engagement with a tooth of the gear whereby the rolling movement of the rocking member will cause the contact member to move in contact with the face of said tooth, said contact member having an independent rocking movement caused by imperfections in the tooth's surface, and an indicator operated by said contact member.

8. In a gear testing mechanism the combination of a support for the gear to be tested, a circular disk coaxial with the gear and of approximately the same diameter as that of the base circle of the gear teeth, a rocking member having a rolling motion along the periphery of the disk, a contact member pivotally mounted on the rocking member for engagement with the surface of a gear tooth, and an indicator operated by said contact member.

9. In a gear testing mechanism the combination of a support for the gear t be tested, a circular disk coaxial with the gear and of approximately the same diameter as that of the base circle of the gear teeth, a rocking member having a rolling motion along the periphery of the disk, a contact member pivotally mounted on the rocking member for engagement with the surface of a gear tooth and a detent for engaging a tooth of the gear to determine the accuracy of spacing of the gear teeth, between said detent contact member, and an indicator opperated by said contact member.

In witness whereof I have hereunto set my hand this 25th day of July, 1919.

OSCAR C. KAVLE.

Witnesses:
H. E. CHASE,
N. ROOT.